United States Patent Office 3,398,288
Patented Aug. 20, 1968

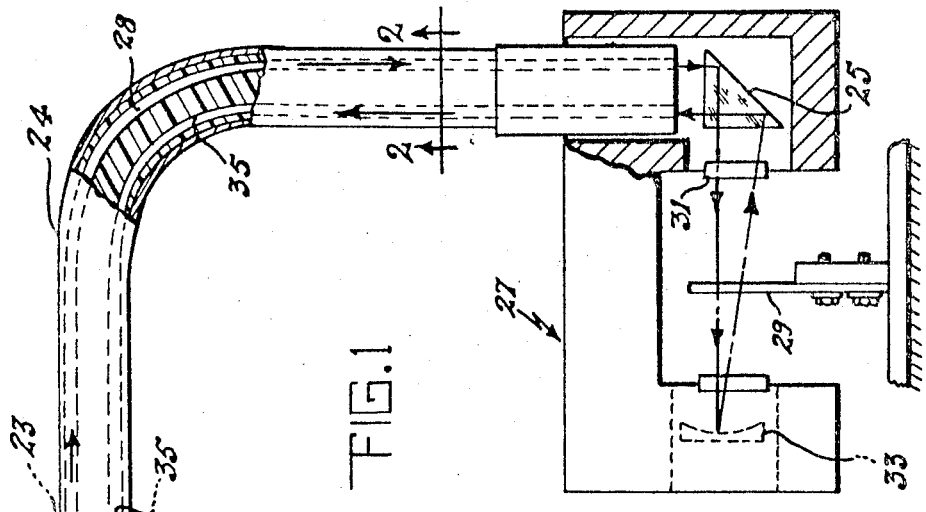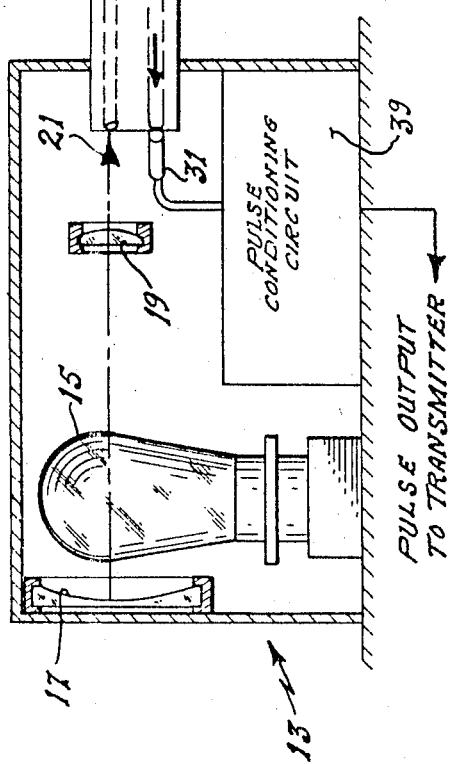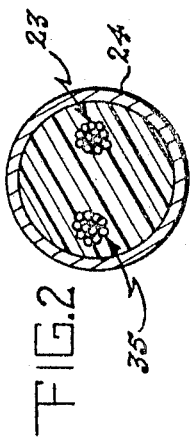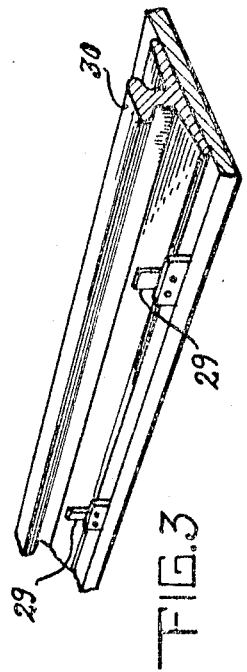

3,398,288
VELOCITY SELECTOR USING LIGHT CONDUCTING RODS AND A PLURALITY OF LIGHT BEAM INTERRUPTERS
Warren M. Sanders and Elvin W. Melton, Alamogordo, N. Mex., assignors to the United States of America as represented by the Secretary of the Air Force
Filed Feb. 16, 1965, Ser. No. 433,237
5 Claims. (Cl. 250—222)

ABSTRACT OF THE DISCLOSURE

A time and distance measuring system having a light source positioned on a moving object and fiber optic light conducting means operating to direct a beam from the light source to a remotely located slipper and back to a sensing means at the light source. A plurality of fixedly positioned spaced interrupters operate to intermittently block the light beam as the object moves along a fixed path, the time intervals between interruptions being measurable to indicate the time rate of change of velocity of the object.

---

The invention described herein may be manufactured and used by or for the United States Government for governmental purposes without payment to us of any royalty thereon.

This invention relates to a system for measuring the velocity of a vehicle moving along a track, and is more particularly concerned with a vehicle speed monitoring system having a sensing head which utilizes fiber optics to direct light to a slipper unit and back to a photodetector unit located on the vehicle body.

When testing equipment and personnel to be subjected to high speed acceleration and deceleration forces, it is generally accepted practice to mount the material or personnel on a high velocity sled. There are many conventional methods of determining the velocity and acceleration of the sled and associated equipment, some of the methods being more accurate and reliable than others. For most applications, it is sufficient that reasonably close measurements of the time and distance factors used in determining velocity be made. In certain instances where it is necessary to make unusually precise measurements of the velocity and acceleration, the use of electronic equipment is necessary. However, at high acceleration and deceleration rates the equipment may be subjected to severe shock and vibration causing it to fail in use. The present invention minimizes the possibility of damage or failure of the electronic equipment as a result of shock and vibration by locating most of it in the instrument compartment of the vehicle.

Accordingly, it is an object of the present invention to provide a velocity measuring system for determining with extreme accuracy the speed and acceleration of a vehicle moving at high speeds along a track.

Another object of the invention is to provide a velocity measuring system wherein the highly sensitive electronic equipment which is utilized for making precise measurements is conveniently located in the instrumentation compartment of the vehicle. This arrangement removes the equipment from the slipper member which contains only optical elements thus reducing the possibility of physical damage to the electronic equipment.

Still another object of the invention is to provide a velocity measuring system having a sensing head which is separated from the associated electronic equipment thereby improving the reliability of the equipment.

A still further object of the invention is to provide a velocity measuring system utilizing a light source and light interrupting means to create a pulsating signal which is directly proportional to the linear velocity of the moving vehicle.

Another still further object of the present invention is to provide a velocity measuring system which utilizes the relatively new concept of fiber optics to transmit a light beam through small slit openings to and from the slipper beam unit. This approach to the velocity measuring problem also increases the position measurement accuracy as the light can be collimated into a very narrow beam and received through an extremely thin slit.

These and other objects, features and advantages will become more apparent after considering the following detailed description taken in conjunction with the annexed drawings, wherein:

FIGURE 1 is a schematic view in partial section of a preferred embodiment of the invention;

FIGURE 2 is a cross-sectional view of the light conducting cable taken along the line 2—2; and FIGURE 3 is a view in perspective of the track showing light interrupters at spaced intervals.

Referring now to the drawings wherein similar reference characters designate corresponding parts throughout, there is shown in partial section a schematic view of the fiber optics space/time sensing head. A container 13 is mounted on the sled for housing equipment including a light source 15 fixedly attached to said container. A concave mirror 17 is mounted behind said light source 15 for reflecting ambient light toward collimating lens 19 which is located on the optical axis of the reflected light beam. The collimated light beam represented by the arrow 21 impinges on the receiving end of fiber optic bundle 23 located in light conducting cable 24 and transmits the light beam to the prism 25 located in the slipper member 27.

A series of light interrupters 29 are positioned in parallel relationship to the track 30 on which the sled vehicle travels. The prism 25 directs the light beam 21 through a slit 31 in the slipper 27 and, provided a light interrupter 29 is not in the path, impinges on a concave mirror 33 located directly opposite the prism 25. The light beam 21 is then reflected back through the slit 31 to the prism 25 which directs the beam through the fiber optic bundle 35 also positioned in the light conducting cable 24. The fiber optic bundle 35 operates to conduct the reflected light beam 21 to a photo-transistor 37 located at the output end of the optic bundle 35. Signal pulses caused by the intermittent interruption of the light beam as the vehicle moves along the track 30 and received by the photo-transistor 37 are conditioned by the pulse conditioning circuitry 39 and fed to a transmitter (not shown).

These conditioned pulses which mark the sled's position are received at the ground station and fed into a quantizer. The quantizer clock rate is 5 mc./second. Each pulse received causes the quantizer to read out the accumulated time from the sled's first motion. This time is binary coded and recorded on magnetic tape for automatic reduction. From this position and time data, the velocity and acceleration of the test vehicle is determined.

In operation, the container 13 which houses the sensitive electronic equipment is mounted on the sled. Extending outwardly and downwardly from one side of the container 13 is a light conducting cable 24. At the outer end of the cable 24 there is positioned an inverted U-shaped slipper member 24 which is positioned to pass over the light interrupters 29. As the sled moves along the track 30, the slipper member 13 passes over the series of light interrupters 29 at the same speed and corresponding position as the sled.

The light source 15 in conjunction with the reflector 17 and the lens system 19 sends a collimated light beam 21 through the light conducting cable 24 along the transmitting fiber optic bundle 23 to the prism 25 located in the slipper member 27. The prism 25 causes the light beam 21 to be diverted at a right angle through the slit 31 toward concave mirror 33. Located at fixed intervals along the track 30 are a series of light interrupters 29 which operate to intermittently block the light beam 21. When the light interrupter 29 is not in optical alignment with the light beam 21 the light beam 21 is reflected from concave mirror 33 back through slit 31 to prism 25 which directs the beam through fiber optic bundle 35 to phototransistor element 37. The intermittent breaking of the light beam 21 by the light interrupters 29 generates a signal pulse which corresponds in frequency to the speed of the test vehicle and which produces an accurate indication of the location of the test vehicle on the track at any given time. Associated electronic equipment mounted on the test vehicle and at a ground station receive and condition the signal pulses and produce indications of velocity, position, acceleration, and deceleration of the test vehicle for any time interval.

In a preferred embodiment of the invention, the light interrupters 29 are blades which are precision machined to a dimension of two inches (plus or minus .001) wide and two and one-half inches high. The interrupters 29 are spaced at 13 foot intervals alongside one of the tracks 30 for the full length of the track which may be six to seven miles long. The thirteen foot spacing of the interrupters is arbitrary and may be spaced at greater or lesser distances depending on the number of sled position sampling points desired. Also, the two inch width of the light interrupters 29 is selected in order to assure that the light on the photo-transistor element 37 will be extinguished for an adequate period of time to establish the proper triggering level for generation of the data pulse.

From the foregoing, it will be seen that the invention has been presented with particular emphasis on a preferred embodiment. It will be apparent to one skilled in the art that certain changes, alterations, modifications and substitutions can be made in the various elements without departing from the true spirit and scope of the invention as defined in the appended claims.

Having thus set forth and disclosed the nature of our invention what we claim is:

1. A system for measuring the velocity of a fast moving vehicle along a track comprising a container fixedly attached to said vehicle for mounting equipment therein, a light source attached to the base of said container, light conducting means extending outwardly and downwardly from said container for transmitting light from said light source, an inverted U-shaped slipper member fixedly attached to the outer end of said light conducting means, a series of stationary upstanding light interrupting members disposed between the legs of said slipper member, said light interrupting members being intermittently positioned along the length of the vehicle carying track for blocking the passage of light across the legs of said U-shaped slipper member, a first reflecting means positioned in one leg of said slipper member for receiving and reflecting light from said light conducting means toward said light interrupting members, a second reflecting means positioned in the other leg of said slipper member for receiving and returning the reflected light when not blocked by said light interrupting members back to said first reflecting means, said first reflecting means directing the reflected light toward said light conducting means for passage therethrough, photosensitive means at the container end of said light conducting means for receiving and transforming the intermittently reflected light into electronic pulse signals, pulse conditioning means for receiving and conditioning the pulse signals from said photosensitive means, and transmitting means for sending the conditioned pulse signals to a remote location for processing to indicate the velocity and position of the vehicle at any given time interval.

2. The velocity measuring system defined in claim 1 wherein said light conducting means includes a first fiber optic bundle for transmitting the light from said light source to said slipper member and a second fiber optic bundle in substantially parallel relationship to said first fiber optic bundle for returning the reflected light back to the photosensitive means.

3. The velocity measuring system defined in claim 2 wherein collimating means are interposed between the light source and the receiving end of said first fiber optic bundle for aligning the rays from said light source into a concentrated light beam.

4. A system for measuring the velocity of a fast moving vehicle along a track comprising a container for mounting equipment therein disposed on said moving vehicle, a light source fixedly positioned in said container, collimating means in front of said light source for receiving and transforming light rays from said light source into a concentrated light beam, a light conductor extending outwardly and downwardly from said container, an inverted U-shaped slipper member fixedly attached to the outer end of said light conductor, means for transmitting the light beam through said light conductor to said slipper member, prism means disposed in one leg of said U-shaped slipper member for reflecting the light beam at substantially right angles therefrom, a series of stationary upstanding light interrupting members disposed between the legs of said slipper member, said light interrupting members being intermittently positioned along the side of the vehicle carrying track for alternately blocking and allowing the passage of light across the legs of said U-shaped slipper member, reflecting means disposed in the other leg of said U-shaped slipper member for receiving and reflecting the light beam when not blocked by said light interrupting members as said slipper member moves relative thereto, said prism means receiving the intermittent beams of light from said reflecting means and directing the beam upwardly toward said light conductor, means in said light conductor for returning the reflected light beam back toward said container on said vehicle, photosensitive means at the output end of said light returning means for receiving and transforming the intermittent beams of light into electronic pulse signals, pulse conditioning means for receiving and conditioning the pulse signals from said photosensitive means, and transmitting means for sending the conditioned pulse signals to a remote location for processing to indicate the velocity and position of the vehicle at any given time interval.

5. The velocity measuring system defined in claim 4 wherein a concave mirror is positioned behind said light source for reflecting ambient light therefrom toward said collimating means.

References Cited
UNITED STATES PATENTS

| | | | |
|---|---|---|---|
| 1,717,752 | 6/1929 | Baesler | 250—234 |
| 1,958,631 | 5/1934 | Logan | 250—233 |
| 3,136,310 | 6/1964 | Meltzer | 250—227 |

RALPH G. NILSON, *Primary Examiner.*

M. ABRAMSON, *Assistant Examiner.*